United States Patent
Gouterman et al.

(10) Patent No.: US 8,898,609 B1
(45) Date of Patent: Nov. 25, 2014

(54) METHOD AND APPARATUS FOR INTEGRATING SIGNAL TRANSITION TIME MODELING DURING ROUTING

(75) Inventors: Vadim Gouterman, Toronto (CA); Ryan Fung, Mississauga (CA)

(73) Assignee: Altera Corporation, San Jose, CA (US)

( * ) Notice: Subject to any disclaimer, the term of this patent is extended or adjusted under 35 U.S.C. 154(b) by 907 days.

(21) Appl. No.: 11/488,392

(22) Filed: Jul. 18, 2006

(51) Int. Cl.
*G06F 17/50* (2006.01)

(52) U.S. Cl.
USPC .......................................... 716/114; 716/126

(58) Field of Classification Search
CPC ......................... G06F 17/5031; G06F 2217/84
USPC .................... 716/13, 121, 113, 126
See application file for complete search history.

(56) References Cited

U.S. PATENT DOCUMENTS

| | | | |
|---|---|---|---|
| 5,521,837 A * | 5/1996 | Frankle et al. | 716/113 |
| 6,279,142 B1 * | 8/2001 | Bowen et al. | 716/5 |
| 6,314,546 B1 * | 11/2001 | Muddu | 716/5 |
| 6,388,277 B1 * | 5/2002 | Kobayashi et al. | 257/207 |
| 6,574,781 B1 * | 6/2003 | Harada et al. | 716/5 |
| 6,754,877 B1 * | 6/2004 | Srinivasan | 716/2 |
| 6,789,248 B1 * | 9/2004 | Lu et al. | 716/18 |
| 6,877,040 B1 * | 4/2005 | Nam et al. | 709/238 |
| 7,225,422 B2 * | 5/2007 | Bucki et al. | 716/121 |
| 7,386,822 B1 * | 6/2008 | Hu | 716/121 |
| 7,389,485 B1 * | 6/2008 | Rahut et al. | 716/12 |

OTHER PUBLICATIONS

Donath et al., "Timing Driven Placement Using Complete Path Delays," Proc. 27th Design Automation Conference, pp. 84-89, 1990.*
http://en.wikipedia.org/wiki/Static_timing_analysis.*

* cited by examiner

*Primary Examiner* — Jack Chiang
*Assistant Examiner* — Brandon Bowers
(74) *Attorney, Agent, or Firm* — L. Cho

(57) ABSTRACT

A method for performing routing for a logic design includes utilizing signal transition time as a criteria for selecting resources to provide interconnection between the components of the logic design.

34 Claims, 9 Drawing Sheets

METHOD AND APPARATUS FOR INTEGRATING SIGNAL TRANSITION TIME MODELING DURING ROUTING

TECHNICAL FIELD

The present invention relates to electronic design automation (EDA) tools. More specifically, the present invention relates to a method and apparatus for integrating signal transition time modeling during routing in an EDA tool.

BACKGROUND

Signal transition time is defined as the delay between two points during the change of a logical value. The two points are commonly defined at 10% and 90% of the power voltage. FIG. 1 illustrates an example of a rising signal transition. Signal transition times can vary in logic designs such as ASIC, structured ASIC, field programmable gate array (FPGA), and printed circuit board (PCB) products. Depending on the input waveform, capacitive loading, the nature of the driving logic element, and traveling distance of a signal, the transition time of the signal can vary ten times or even more on a given chip.

Signal transition times can impact the timing and power consumption of logic designs in several ways. For example, the delay of combinational and sequential logic elements along a signal path (signal delay) is a function of signal transition time. Also, during signal transition time, both p and n MOSFETs in CMOS logic are open which creates a short circuit path between power and ground. Thus, modeling and controlling signal transition times on an logic design is desirable from a timing and power stand point.

In the past, EDA tools were forced to adhere to signal integrity rules by observing indirect constraints, such as maximum fan-out limitations and maximum capacitive loading limitations. This was followed by post-processing procedures that attempted to fix violations in the routed design by inserting new buffers or upsizing existing buffers. This resulted in sub-optimal designs.

Thus, what is needed is an efficient method and apparatus for integrating signal transition time modeling during routing in an EDA tool.

SUMMARY

According to an embodiment of the present invention, routing resources are selected for connections using signal transition time as a criterion. According to one aspect of this embodiment, a cost function used by a routing unit is dependent on signal transition time. This allows the routing unit to properly trade-off between wire length, congestion, power, timing, and signal integrity objectives if they are in conflict.

According to an embodiment of the present invention, a strategy for analyzing and optimizing signal transition time during routing is disclosed. According to one aspect of this embodiment, static timing analysis is performed between routing iterations where transition time budgets may be determined and updated. The determined and updated transition time budgets are enforced during subsequent routing iterations in order to generate a legal routing solution.

BRIEF DESCRIPTION OF THE DRAWINGS

The features and advantages of the present invention are illustrated by way of example and are by no means intended to limit the scope of the present invention to the particular embodiments shown.

DETAILED DESCRIPTION

In the following description, for purposes of explanation, specific nomenclature is set forth to provide a thorough understanding of embodiments of the present invention. It will be apparent to one skilled in the art that specific details in the description may not be required to practice the embodiments of the present invention. In other instances, well-known circuits, devices, and programs are shown in block diagram form to avoid obscuring embodiments of the present invention unnecessarily.

Figure 1:
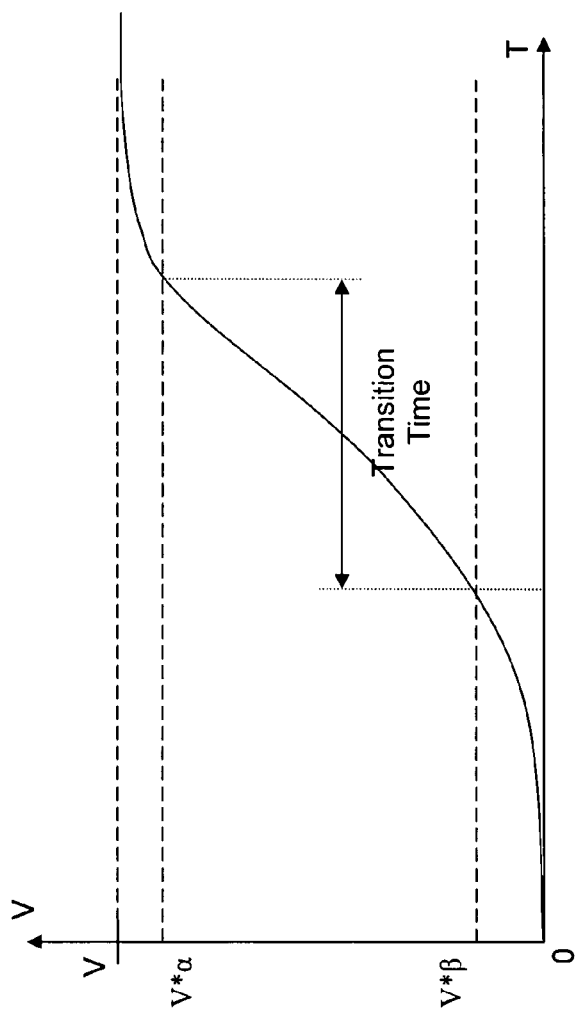
FIG. 1 illustrates an example of the transition time of a rising signal.
Figure 2:
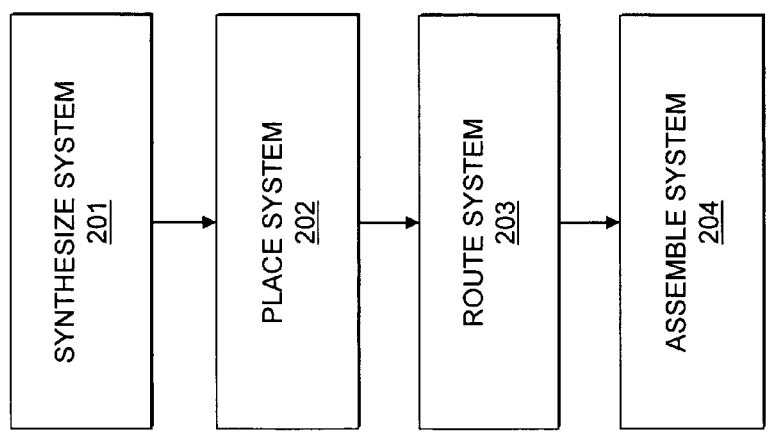
FIG. 2 is a flow chart illustrating a method for designing a system on a logic design according to an embodiment of the present invention.

FIG. 2 is a flow chart illustrating a method for designing a system according to an embodiment of the present invention. The target device may be an ASIC, structured ASIC, FPGA, programmable logic device (PLD), printed circuit board (PCB), or other target device. At 201, the system is synthesized. Synthesis includes generating a logic design of the system to be implemented. According to an embodiment of the present invention, synthesis generates an optimized logical representation of the system from a HDL design definition. The optimized logical representation of the system may include a representation that has a minimized number of functional blocks and registers, such as logic gates and logic elements, required for the system. Synthesis also includes mapping the optimized logic design. Mapping includes determining how to implement logic gates and logic elements in the optimized logic representation with resources (components) available on the target device. According to an embodiment of the present invention, a netlist is generated from mapping. This netlist may be an optimized technology-mapped netlist generated from the HDL.

At 202, the mapped logical system design is placed. Placement works on the optimized technology-mapped netlist to produce a placement for each of the functional blocks. According to an embodiment of the present invention for a target device that is a structured ASIC, placement includes fitting the system on the target device by determining which components on the logic design are to be used for specific logic elements, and other function blocks.

At 203, it is determined which routing resources should be used to connect the components in the logic design implementing the functional blocks of the system. According to an embodiment of the present invention, signal transition time is utilized as a criterion for selecting resources used to implement connections in routing. According to one aspect of this embodiment, routing resources are selected utilizing the signal transition time of the routing resources as a criteria for selection. According to an alternate aspect of this embodiment, a first set of initial transition time budgets are calculated. According to an embodiment of the present invention, transition time budgets may be defined as a range of transition times valid for a given point in the design. Transition time budgets can optionally have low and high limits. It is possible to have one or more or none. The system is routed on the target device. A second set of pre-timing analysis transition time budgets is calculated utilizing information from the routing. The second set of pre-timing analysis transition time budgets is calculated to guide static timing analysis. Static timing analysis is performed on the routing using the second set of initial transition time budgets. Transition time budgets utilizing information from the static timing analysis are calculated. The system on the target device is rerouted using the transition time budgets if the routing is found to be illegal.

At 204, an assembly procedure is performed. The assembly procedure involves creating a data file or set of files that includes information determined by the fitting procedure described by 201-203. The data file may be a bit stream that may be used to program the target device or a set of layout masks used to manufacture the device.

Figure 3:
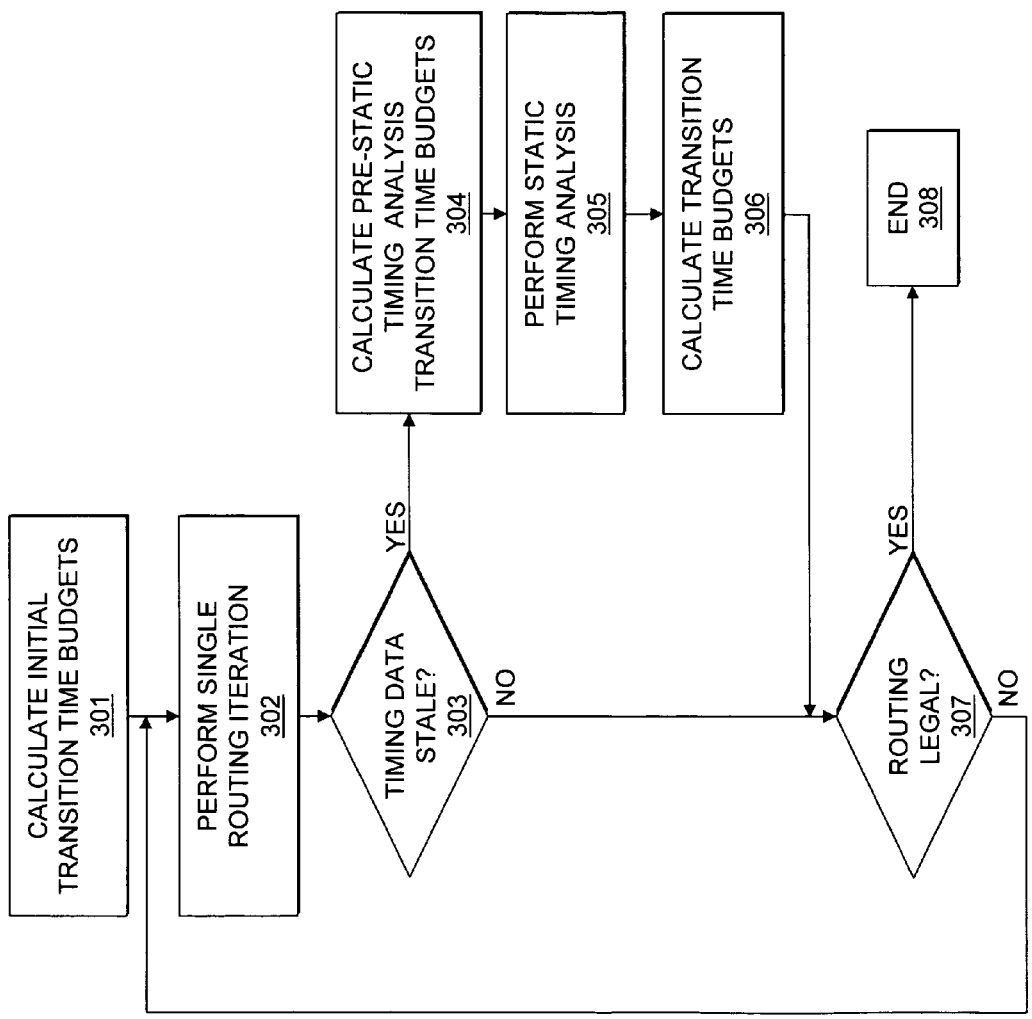
FIG. 3 is a flow chart illustrating a method for performing routing using transition time budgets according to an embodiment of the present invention.

FIG. 3 is a flow chart illustrating a method for performing routing using transition time budgets according to an embodiment of the present invention. The procedures shown in FIG. 3 may be used to implement 203 (shown in FIG. 2) after placement. At 301, a first set of initial transition time budgets are calculated for various components in the system design. The first set of initial transition time budgets may be calculated using signal transition times specified by a user, signal transition times of components on a target device, and output capacitive loading estimated based on placement.

At 302, a single routing iteration is performed on the system. The placement locations of functional blocks and previously calculated transition time budgets of component on the target device used for implementing the functional blocks are used to generate a routing a solution. The routing solution includes set of routing and buffering resources utilized to implement connections for routing between components, signal propagation delay values, and buffer allocations. According to an embodiment of the present invention, before the first routing iteration, input signal transition times and output signal transition times of many blocks are unknown. In order to perform routing, assumptions must be made about the unknown transition times. According to an embodiment of the present invention, transition time budgets calculated at 301 are used to guide the router. Otherwise, where necessary input signal transition times are assumed for the respective components. According to an embodiment of the present invention, the assumed input signal transition times can be derived based on the estimates of the distributions of the input transition times in the finished systems. According to an embodiment of the present invention, routing is performed based on the assumption that all connections in the routing should be routed for minimum delay.

At 303, it is determined whether the timing data is stale. The timing data may include signal arrival times, signal propagation delays, and signal transition times to components on the system. According to an embodiment of the present invention, timing data may be determined to be stale if a routing solution is produced that does not overuse routing resources such as wires and buffers. According to an alternate embodiment of the present invention, timing data may be determined to be stale if static timing analysis has not been run for some predetermined number of routing iterations.

Timing data may also be determined to be stale if static timing analysis has not been run for some predetermined number of iterations and there has been sufficient change in block output transition times, where for example, the absolute change in transition time is larger than a predetermined threshold. If the timing data is determined to be stale, control proceeds to 304. If the timing data is not determined to be stale, control proceeds to 307. to an alternate embodiment of the present invention, the timing data is never determined to be stale.

At 304, a set of pre-static timing analysis transition time budgets are calculated. As described with reference to 301, transition time budgets may be calculated for various components in the system design. These components may include, for example, resources on a target device for implementing functional block inputs and outputs, and routing net inputs and outputs. According to an embodiment of the present invention, pre-static timing analysis transition time budgets may be computed utilizing signal transition times specified by a user, signal transition time requirements of components on the target device, and actual output capacitance loading derived from routing. A backward traversal of timing graphs from points with known input and/or output transition time budgets may be performed to determine transition time budgets. According to an embodiment of the present invention, a forward traversal can be performed to compute implied downstream transition times based on implied transition times and known transition time budgets. Implied transition times can be used to guide calculation of transition time budgets. According to an embodiment of the present invention, the transition time budgets may include output transition time budgets and input transition time budgets that may be calculated using the following relationships.

$$t_{output\ MAX}^{transition} = \underset{i}{MAX} f_i(t_i^{transition}, C_{output}); \forall\ i \in N; \quad (1)$$

$$t_{output\ MIN}^{transition} = \underset{i}{MIN} f_i(t_i^{transition}, C_{output}); \forall\ i \in N;\ \text{and} \quad (2)$$

$$t_{input}^{transition} = \gamma \cdot d + t_{output}^{transition} \cdot e^{-\left(\frac{d}{t_{output}^{transition}}\right)}. \quad (3)$$

In relationships (1) and (2) minimum and maximum is computed over all inputs "i" from set "N", where "N" is a full set of inputs that affect output, and $t_i^{transition}$ are input transition times on input "i". In relationship (3), d is the distributed interconnect delay from the source or the last inserted buffer to the next buffer or sink. In an embodiment where routing and/or static timing analysis uses Elmore delay, distributed interconnect delay may be calculated as $d=rc/2+rC_{input}$, where "r" and "c" are distributed wire resistance and capacitance, and "$C_{input}$" is sink input capacitance, and where $\gamma$ is a positive number. According to an embodiment of the present invention, functions $f_i$ can be expressed as table lookups. In an alternative embodiment functions $f_i$ can be expressed as analytic relationships. It should be appreciated that relationships (1) and (2) can be used during forward traversal to compute output transition times given input transition times and during backward traversal to compute input transition times given output transition times.

According to an embodiment of the present invention during backward traversal at 304 transition time budgets can be computed from other transition time budgets and connection timing windows. According to an embodiment of the present invention a determination can be made if a buffered routing resource should be selected. Determination of selection of the buffered routing resource can be made based on optimizing transition time budgets and/or optimizing signal timing. If the buffered routing resource should be selected, source output transition time budget is determined according to the requirements of the selected buffering resource. Requirements of the selected buffering resource can be a function of its fanout. If the buffering resource should not be selected, source output transition time budgets is determined according to the destination input transition time budgets. According to an embodiment of the present invention, determination about selection and allocation of buffered routing resources is made based on a table lookup. Lookup can be made based on connection timing window, transition time requirement at the destination or the source, and location of the source and destinations.

At 305, static timing analysis is performed on the routing for the system design. Static timing analysis needs to know propagation delays and propagation delays are function of the transition times. By determining a set of pre-static timing analysis transition time budgets, the static timing analysis can be made more accurate. Signal transition times and signal arrival times are generated from the static timing analysis. According to an embodiment of the present invention, static timing analysis may be performed by with a forward traversal of the timing analysis. Static timing analysis may be performed using an estimation of the resistance-capacitance (RC) delay along routes determined from routing and an estimation of the capacitive loading seen by the net sources. Static timing analysis may also be performed using lower-bound estimates of delay and capacitive loading. According to an embodiment of the present invention, static timing analysis calculates actual input and output transition times during forward traversal. Signal transition times may be computed by utilizing relationships (1) and (2). According to an embodiment of the present invention, static timing analysis calculates signal propagation and arrival times as a function of signal transition times. Table lookup can be used to compute signal propagation delay. Alternatively, a function can be used to compute signal propagation delay. It should be appreciated that other techniques may be used and that one or more of these techniques may be used alone or in combination.

At 306, transition time budgets are calculated. According to an embodiment of the present invention, the transition time budgets may be computed utilizing signal transition times specified by a user, signal transition time requirements of components on the target device, actual output capacitance loading derived from routing, actual transition times propagated during static timing analysis, and signal arrival times. According to an embodiment of the present invention, the transition time budgets may include output transition time budgets and input transition time budgets that may be calculated using the following relationships.

$$t_{output}^{transition} = \text{MAX}_i f_i(t_i^{transition}, C_{output}); \forall i \in L; L \subseteq N, \text{ and} \quad (4)$$

$$t_{output}^{transition} = \text{MIN}_i f_i(t_i^{transition}, C_{output}); \forall i \in L; L \subseteq N \quad (5)$$

In these relationships, minimum and maximum is computed over all inputs "i" from set "L". "N" is the full set of inputs that affect output, and "L" is a subset of inputs that affect the output and is also a subset of "N". The subset "L" can be defined to exclude signals that will not affect output transition time and will not cause violation of other constraints, including short circuit current, timing, and power constraints. According to an embodiment of the present invention, subset "L" may be defined to solely include the last arriving signal, or signals arriving within a specified period of time from the last arriving signal. The specified period of time may be a global constant, a function of the output transition time, or other parameter. The relationship labeled (3) may be used to calculate input or output transition time budgets.

It should be appreciated that the calculation of initial transition time budgets at 301, 304, and 306 are optional. Thus, one or more of the calculations made at 301, 304, and 306 may be removed from the procedure shown in FIG. 3 according to alternate embodiments of the present invention.

At 307, it is determined whether the routing solution from 302 is legal. According to an embodiment of the present invention, the legality of a routing solution may be determined by evaluating whether a routing solution shorted together different signals, whether a routing solution disconnects required connections, whether a routing solution overuses available routing resources, whether timing constraints are satisfied, whether transition time constraints are satisfied, whether power constraints are satisfied, and/or whether other conditions have been satisfied. If the routing solution is legal, control proceeds to 308. If the routing solution is not legal, control returns to 302.

Upon returning to 302, another signal routing iteration is performed. During the routing iteration, some or all connections may be rerouted. For each connection being rerouted, the output signal transition time of the connection source and sink based on more recent information from the current routing, such as current capacitive loading estimates and signal transition time estimates at the inputs of the functional block driving the current source, are updated.

At 308, control terminates the routing procedure.

Figure 4:
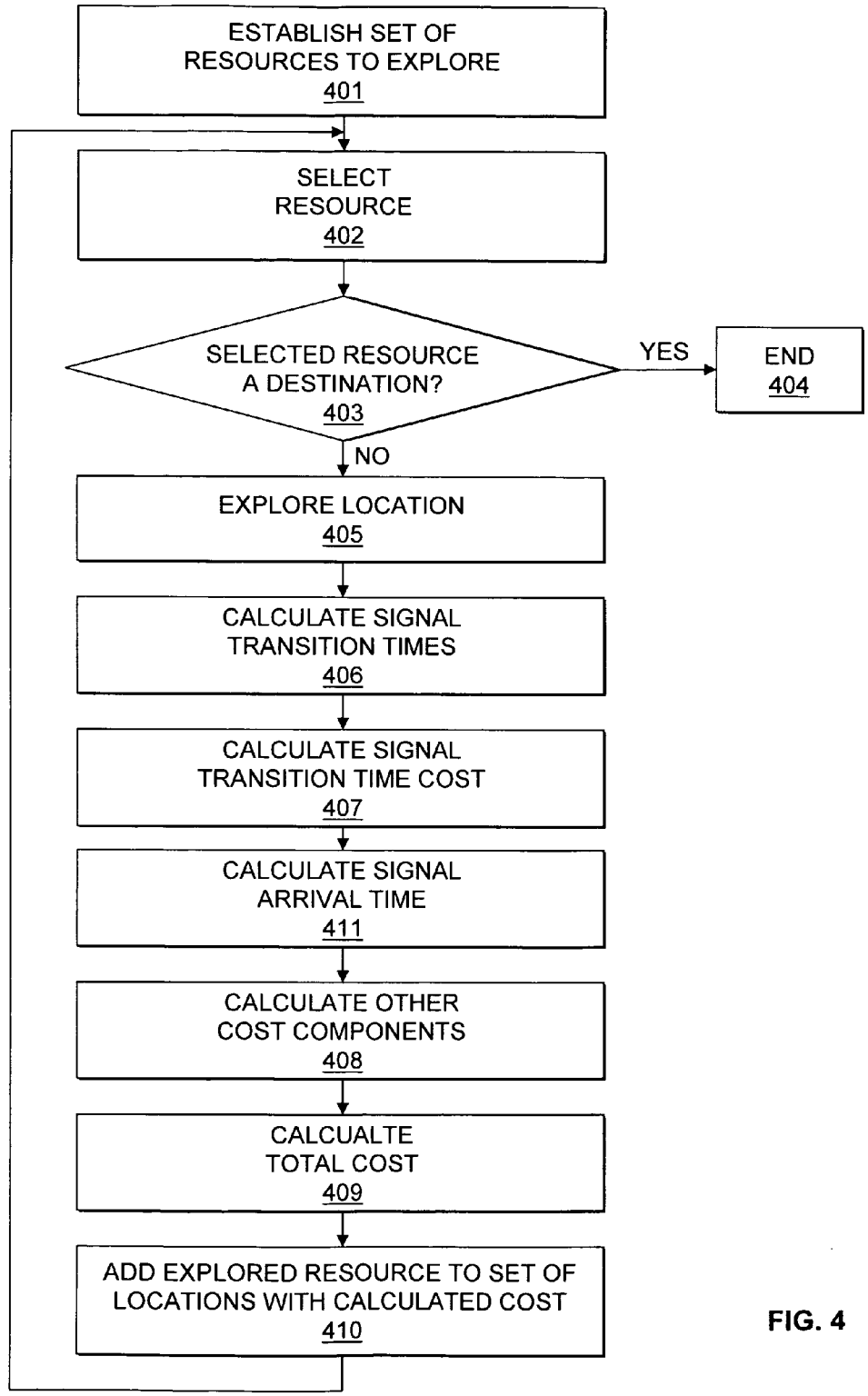
FIG. 4 is a flow chart illustrating a method for performing a routing iteration according to an embodiment of the present invention.

FIG. 4 is a flow chart illustrating a method for performing a routing iteration according to an embodiment of the present invention. The procedure shown in FIG. 4 may be used to implement 302 shown in FIG. 3. At 401, a set of resources to explore are established. According to an embodiment of the present invention, partial routing and/or signal sources are added to the set of resources to explore. Each of the resources has an associated cost.

At 402, a resource is selected. According to an embodiment of the present invention, the resource with the lowest associated cost is selected.

At 403, it is determined whether the selected resource is a destination. If the selected resource is a destination, control proceeds to 404. If the selected resource is not a destination, control proceeds to 405.

At 404, control terminates the procedure.

At 405, a location associated with the selected resource is explored. According to an embodiment of the present invention, exploring the location includes identifying resources available for routing from the location.

At 406, signal transition times are calculated for the resources identified. The signal transition times may be calculated based on previous transition times and properties of the resources identified. According to an embodiment of the present invention, an estimation of the capacitive loading at a current point of expansion is computed. The capacitive loading may be defined as a combination of look-behind loading (loading from the driver to a current point) and look-ahead loading (loading from the current point to a destination). The computed estimation of output capacitive loading may be used to calculate an output transition time of source or buffers using the following relationship.

$$t_{output}^{transition} = \text{MAX}_i f_i(t_i^{transition}, C_{output}); \forall\, i \in N \quad (6)$$

Input transition time on the sink or next buffer may be calculated using the relationship labeled (3).

At 407, a signal transition time cost is calculated for each of the resources identified. According to an embodiment of the present invention, the signal transition time cost is calculated based on a current transition time for a resource, and estimated output and input transition times. The following relationship may be used to calculate the signal transition time cost.

$$S = S_l + S_h \quad (7)$$

If (tl) is defined and t<tl, $S_l = \chi(tl-t)^\phi$, otherwise $S_l = 0$
If (th) is defined and t>th, $S_h = \chi(t-th)^\phi$ otherwise $S_h = 0$ In this relationship, S is a signal transition time cost, t is the actual transition time, transition time budget consisting of optional low "tl" and "th" high limits, and $\chi$ and $\phi$ are positive numbers. To help convergence, as the router approaches a final solution, multiplier $\chi$ can be gradually increased to ensure the transition time budgets are met, and/or transition time fluctuations are reduced.

At 411, signal propagation delay is calculated. According to an embodiment of the present invention, signal propagation delay is calculated based on signal input and output transition times. Table lookup may be used to calculate dependency between signal input, output transition times and signal propagation delay. Alternatively, analytic function may be used to calculate dependency between signal input, output transition times and signal propagation delay.

According to an embodiment of the present invention signal propagation delay is computed according to relationship (8)

$$D = \Delta D_S + D_I + \Delta D_D + O \quad (8)$$

In this relationship $\Delta D_S$ is a change in the propagation delay of the source logic block due to currently routed connection, $D_I$ is the signal propagation delay through the set of routing resources, $\Delta D_D$ is a change in the propagation delay of the destination logic block due to the currently routed connection, and O is change in propagation delay of other components. Different embodiments of the present invention can set any subset of the components of relationship (8) to zero. Source and destination logic block delay changes can be measured by comparing logic block delay under previously assumed conditions to conditions currently estimated during routing. Considered conditions may include signal transition time as well as properties of the routing elements. Previously assumed conditions may be recorded during last static timing analysis. Properties of the routing elements may include capacitance and resistance of the routing resources and logic blocks. According to an embodiment of the present invention changes can be computed by performing a table lookup. According to alternative embodiment of the present invention changes can be computed by evaluating analytical functions.

At 408, other costs associated for each of the resources identified are calculated. According to an embodiment of the present invention, other costs associated with the identified resource may include wire length costs, signal arrival time and propagation delay costs, power costs, and costs associated with other characteristics of the resource. According to an embodiment of the present invention signal propagation delay computed according to relationship (8) is used to compute a timing cost component. The timing cost component may be derived from an actual propagation delay, connection criticality, connection delay budget, or other metrics. According to an alternative embodiment of the present invention, change in the delay of the destination logic block is used to compute a separate cost component that reflects the impact on the outputs of the destination logic block, nets driven by the destination logic block, or other logic blocks.

At 409, the total cost for each of the resources identified are calculated. According to an embodiment of the present invention, the total cost may be a function of each of the costs calculated at 407 and 408.

At 410, the resources identified from 405 with their associated costs calculated at 409 are added to the set of resources to explore. Control returns to 402.

FIGS. 2-4 are flow charts illustrating methods according to embodiments of the present invention. The techniques illustrated in these figures may be performed sequentially, in parallel or in an order other than that which is described. It should be appreciated that not all of the techniques described are required to be performed, that additional techniques may be added, and that some of the illustrated techniques may be substituted with other techniques.

Figure 5:
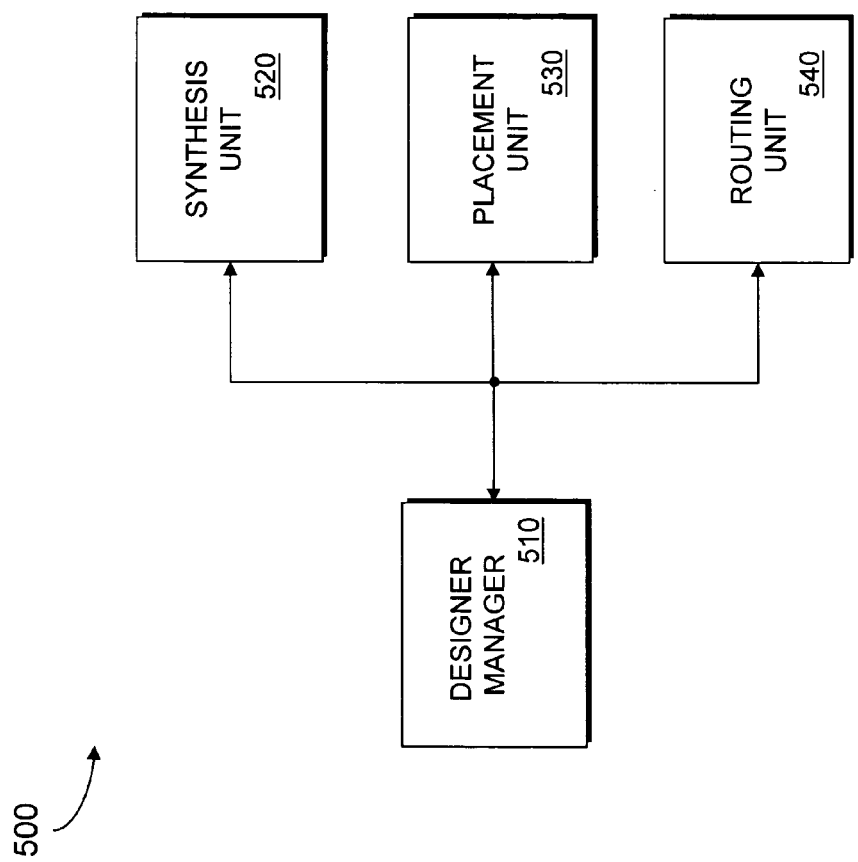
FIG. 5 is a block diagram of a system designer according to an embodiment of the present invention.

FIG. 5 illustrates a system designer 500 according to an embodiment of the present invention. The system designer 500 may be an EDA tool for designing a system on a target device. The target device may be, for example, an ASIC, a structured ASIC, an FPGA, a PLD, a PCB, or other circuitry. Furthermore the logic design may be implemented using semiconductor or nanoelectronic technology. FIG. 5 illustrates software modules implementing an embodiment of the present invention. According to one embodiment, system design may be performed by a computer system (not shown) executing sequences of instructions represented by the software modules shown in FIG. 5. Execution of the sequences of instructions causes the computer system to support system design as will be described hereafter. In alternate embodiments, hard-wire circuitry may be used in place of or in combination with software instructions to implement the present invention. Thus, the present invention is not limited to any specific combination of hardware circuitry and software. The system designer 500 includes a designer manager 510. The designer manager 510 is connected to and transmits data between the components of the system designer 500.

Block 520 represents a synthesis unit. The synthesis unit 520 generates a logic design of a system to be implemented in the target device. According to an embodiment of the system designer 500, the synthesis unit 520 takes a conceptual Hardware Description Language (HDL) design definition and generates an optimized logical representation of the system. The optimized logical representation of the system generated by the synthesis unit 520 may include a representation that has a minimized number of functional blocks and registers, such as logic gates and logic elements, required for the system. Alternatively, the optimized logical representation of the system generated by the synthesis unit 520 may include a representation that has a reduced depth of logic and that generates a lower signal propagation delay. The synthesis unit 520 also determines how to implement the functional blocks and registers in the optimized logic representation utilizing specific resources on a target device thus creating an optimized "technology-mapped" netlist. The technology-mapped netlist illustrates how the resources (components) on the target device are utilized to implement the system. In an embodiment where the target device is an ASIC, the components could be gates or standard cells. In an embodiment where the target device is a structured ASIC, the technology-mapped netlist may contain components that can be implemented in the structured ASIC fabric, such as RAM blocks, multiplier blocks, and gates from a library of gates.

Block 530 represents a placement unit 530. The placement unit 530 helps map the system on to the target device by determining which components or areas on the target device are to be used for specific functional blocks and registers. According to an embodiment of the system designer 500, the placement unit 530 first determines how to implement portions of the optimized logic design in clusters. Clusters may represent a subset of the components on the logic design. In an embodiment where the target device is an ASIC, a cluster may be represented, for example, by a number of standard cells grouped together. In this embodiment, after portions of the optimized logic design are implemented in clusters, the clusters may be placed by assigning the clusters to specific positions on the target device. The placement unit 530 may utilize a cost function in order to determine a good assignment of resources on the target device.

Block 540 represents a routing unit 540. The routing unit 540 determines the routing resources on the target device to use to provide interconnection between the components implementing functional blocks and registers of the logic design. According to an embodiment of the system designer 500, the routing unit 540 uses signal transition time as a criterion for selection of the routing resources used to provide interconnection. According to one aspect of this embodiment, routing resources are selected utilizing the signal transition time on the routing resources as a criteria for selection. According to an alternate aspect of this embodiment, a first set of initial transition time budgets are calculated. By determining a set of initial transition time budgets, the initial routing can be made closer to the final solution by attempting to satisfy user and resource transition time requirements. The system is routed on the target device. A pre-static timing analysis set of transition time budgets is calculated utilizing information from the routing. Static timing analysis is performed on the routing using the pre-static timing analysis set of transition time budgets. Static timing analysis needs to know propagation delays and propagation delays are function of the transition times. By determining a set of pre-static timing analysis transition time budgets, the static timing analysis can be made more accurate. Transition time budgets utilizing information from the static timing analysis are calculated. These transition time budgets can be used to guide routing, or they can be iteratively used to further improve static timing analysis accuracy. The system on the target device is rerouted using the transition time budgets if the routing is found to be illegal. The routing unit 540 may use a cost function to generate a total cost associated with each routing option. The cost function may take into account signal transition time, propagation delay, capacitive loading on a net, power and/or other criteria.

Figure 6:
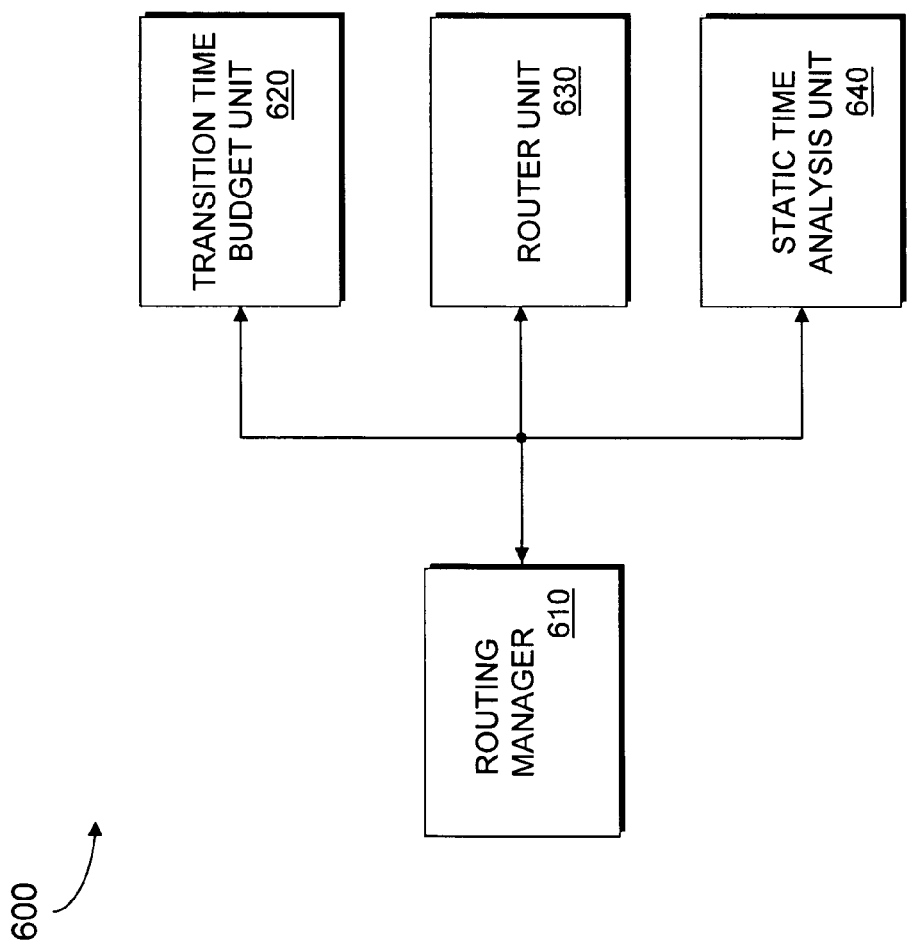
FIG. 6 is a block diagram of a routing unit according to an embodiment of the present invention.

FIG. 6 is a block diagram of a routing unit 600 according to an embodiment of the present invention. The routing unit 600 may be used to implement the routing unit 530 shown in FIG. 5. The routing unit includes a routing manager 610. The routing manager 610 interfaces with and transmits information between components in the routing unit 600.

The routing unit 600 includes a transition time budget unit 620. The transition time budget unit 620 calculates initial transition time budgets and transition time budgets of components on a target device. According to an embodiment of the routing unit 600, the transition time budget unit 620 may calculate the initial transition time budgets and transition time budgets during various phases of routing using different information that may be available. For example, after placement, the transition time budget unit 620 may calculate initial transition time budgets using signal transition time requirements specified by a user, signal transition times of components on a target device, and output capacitive loading estimated based on placement. After routing, the transition time budget unit 620 may calculate pre-static timing analysis transition time budgets using signal transition times specified by a user, signal transition times requirements of component on the target device, and actual output capacitance loading derived from routing. According to an embodiment of the routing unit 600, equations (1)-(3) may be used to compute the pre-static timing analysis transition time budgets. After static timing analysis, the transition time budget unit 620 may calculate transition time budgets using signal transition times specified by a user, signal transition times requirements of component on the target device, actual output capacitance loading derived from routing, actual transition times propagated during static timing analysis, and signal arrival times. In some embodiments, the transition time budgets may also be a function of the transition time budgets of a previous iteration. In those embodiments, the transition time budgets may be gradually tightened as the router approaches a final solution, to ensure that transition time fluctuations are gradually reduced to help convergence. According to an embodiment of the routing unit 600, equations (3)-(5) may be used to compute the transition time budgets.

The routing unit 600 includes a router unit 630. The router unit 630 utilizes previously calculated transition time budgets of component on the target device used for implementing the functional blocks to generate a routing a solution. The routing solution includes routing resources between components, signal propagation delay values, and buffer allocations. According to an embodiment of the routing unit 600, the router unit 630 may perform the procedures illustrated in FIG. 4. According to an embodiment of the present invention, the router unit 630 performs multiple iterations to find a solution. The router unit 630 may be, for example, a rip-up, reroute, or a negotiated congestion router.

After routing is performed, the routing manager 610 may determine whether timing data is stale. The timing data may include signal arrival times and signal transition times to components on the system. Timing data may be determined to be stale by using the criteria discussed with reference to 303 (shown in FIG. 3). If the timing data is determined to be stale, the routing manager 610 may direct the transition time budget unit 620 to calculate a subsequent set of transition time budgets and direct a static time analysis unit 640 to perform static time analysis on the routing solution. If the timing data is not determined to be stale, the routing manager 610 may determine whether the routing solution is legal.

The routing unit 600 includes the static time analysis unit 640. The static time analysis unit 640 performs static time analysis on the routing solution and calculates signal transition times and signal arrival times. Static timing analysis may be performed using one or more of the techniques described with reference to 305 (shown in FIG. 3).

After transition time budgets are calculated, the routing manager 610 may determine whether the routing solution is legal. The legality of a routing solution may be determined by using the criteria discussed with reference to 307 (shown in FIG. 3). If a routing solution is determined to not be legal, the routing manager 610 may direct the router unit 630 to generate another routing solution. During the routing iteration, some or all connections may be rerouted. For each connection being rerouted, the output signal transition time of the connection source and sink based on more recent information from the current routing, such as current capacitive loading estimates and signal transition time estimates at the inputs of the functional block driving the current source can be updated.

Figure 7:
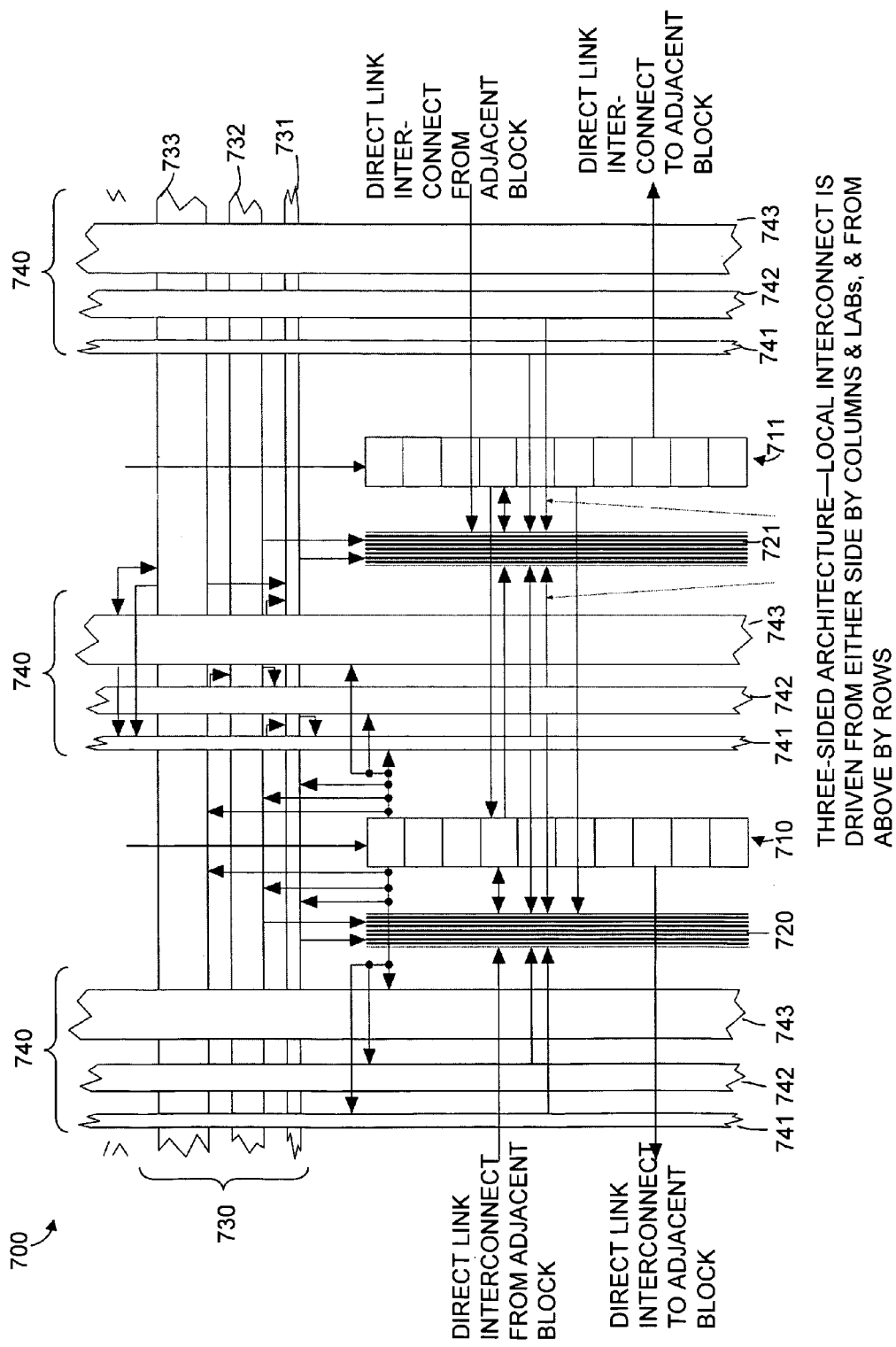
FIG. 7 illustrates an exemplary logic design according to a first embodiment of the present invention.

FIG. 7 illustrates an exemplary target device 700 according to an embodiment of the present invention. The present invention may be used to design a system onto the target device 700 which is an FPGA. According to one embodiment, the target device 700 is a chip having a hierarchical structure that may take advantage of wiring locality properties of circuits formed therein. The lowest level of the hierarchy is a logic element (LE) (not shown). An LE is a small unit of logic providing efficient implementation of user logic functions. According to one embodiment of the target device 700, an LE may include a 4-input lookup table (LUT) with a configurable flip-flop.

The target device 700 includes a plurality of logic-array blocks (LABs). Each LAB is formed from 10 LEs, LE carry chains, LAB control signals, LUT chain, and register chain connection lines. LUT chain connections transfer the output of one LE's LUT to the adjacent LE for fast sequential LUT connections within the same LAB. Register chain connection lines transfer the output of one LE's register to the adjacent LE's register within a LAB. LABs are grouped into rows and columns across the target device 700. A first column of LABs is shown as 710 and a second column of LABs is shown as 711.

The target device 700 includes memory blocks (not shown). The memory blocks may be, for example, dual port random access memory (RAM) blocks that provide dedicated true dual-port, simple dual-port, or single port memory up to various bits wide at up to various frequencies. The memory blocks may be grouped into columns across the target device in between selected LABs or located individually or in pairs within target device 700.

The target device 700 includes digital signal processing (DSP) blocks (not shown). The DSP blocks may be used to implement multipliers of various configurations with add or subtract features. The DSP blocks include shift registers, multipliers, adders, and accumulators. The DSP blocks may be grouped into columns across the target device 700.

The target device 700 includes a plurality of input/output elements (IOEs) (not shown). Each IOE feeds an I/O pin (not shown) on the target device 700. The IOEs are located at the end of LAB rows and columns around the periphery of the target device 700. Each IOE includes a bidirectional I/O buffer and a plurality of registers for registering input, output, and output-enable signals. When used with dedicated clocks, the registers provide performance and interface support with external memory devices, for example.

The target device 700 includes LAB local interconnect lines 720-721 that transfer signals between LEs in the same LAB. The LAB local interconnect lines are driven by column and row interconnects and LE outputs within the same LAB. Neighboring LABs, memory blocks, IOEs, or DSP blocks may also drive the LAB local interconnect lines 720-721 through direct link connections.

The target device 700 also includes a plurality of row interconnect lines ("H-type wires") 730 that span fixed distances. Dedicated row interconnect lines 730, that include H4 731, H8 732, and H24 733 interconnects, route signals to and from LABs, DSP blocks, IOEs, and memory blocks within the same row. The H4 731, H8 732, and H24 733 interconnects span a distance of up to four, eight, and twenty-four LABs respectively, and are used for fast row connections in a four-LAB, eight-LAB, and twenty-four-LAB region. The row interconnects 730 may drive and be driven by LABs, DSP blocks, RAM blocks, and horizontal IOEs.

The target device 700 also includes a plurality of column interconnect lines ("V-type wires") 740 that operate similarly to the row interconnect lines 730. The column interconnect lines 740 vertically routes signals to and from LABs, memory blocks, DSP blocks, and IOEs. Each column of LABs is served by a dedicated column interconnect, which vertically routes signals to and from LABs, memory blocks, DSP blocks, and IOEs. These column interconnect lines 740 include V4 741, V8 742, and V16 743 interconnects that traverse a distance of four, eight, and sixteen blocks respectively, in a vertical direction. It should be appreciated that buffer placement may be performed on any one of the interconnect lines described.

FIG. 7 illustrates an exemplary embodiment of a target device. It should be appreciated that a system may include a plurality of target devices, such as that illustrated in FIG. 7, cascaded together. It should also be appreciated that the target device may include programmable logic devices arranged in a manner different than that on the target device 700. An target device may also include components other than those described in reference to the target device 700. Thus, while the invention described herein may be utilized on the architecture described in FIG. 7, it should be appreciated that it may also be utilized on different architectures, such as those employed by Altera® Corporation in its APEX™, and Mercury™, Stratix™, Stratix™ II, Cyclone™, Cyclone™ II, family of chips and those employed by Xilinx®, Inc. in its Virtex™, Virtex™ II, Virtex™ II Pro, and Virtex™ IV line of chips.

Figure 8:
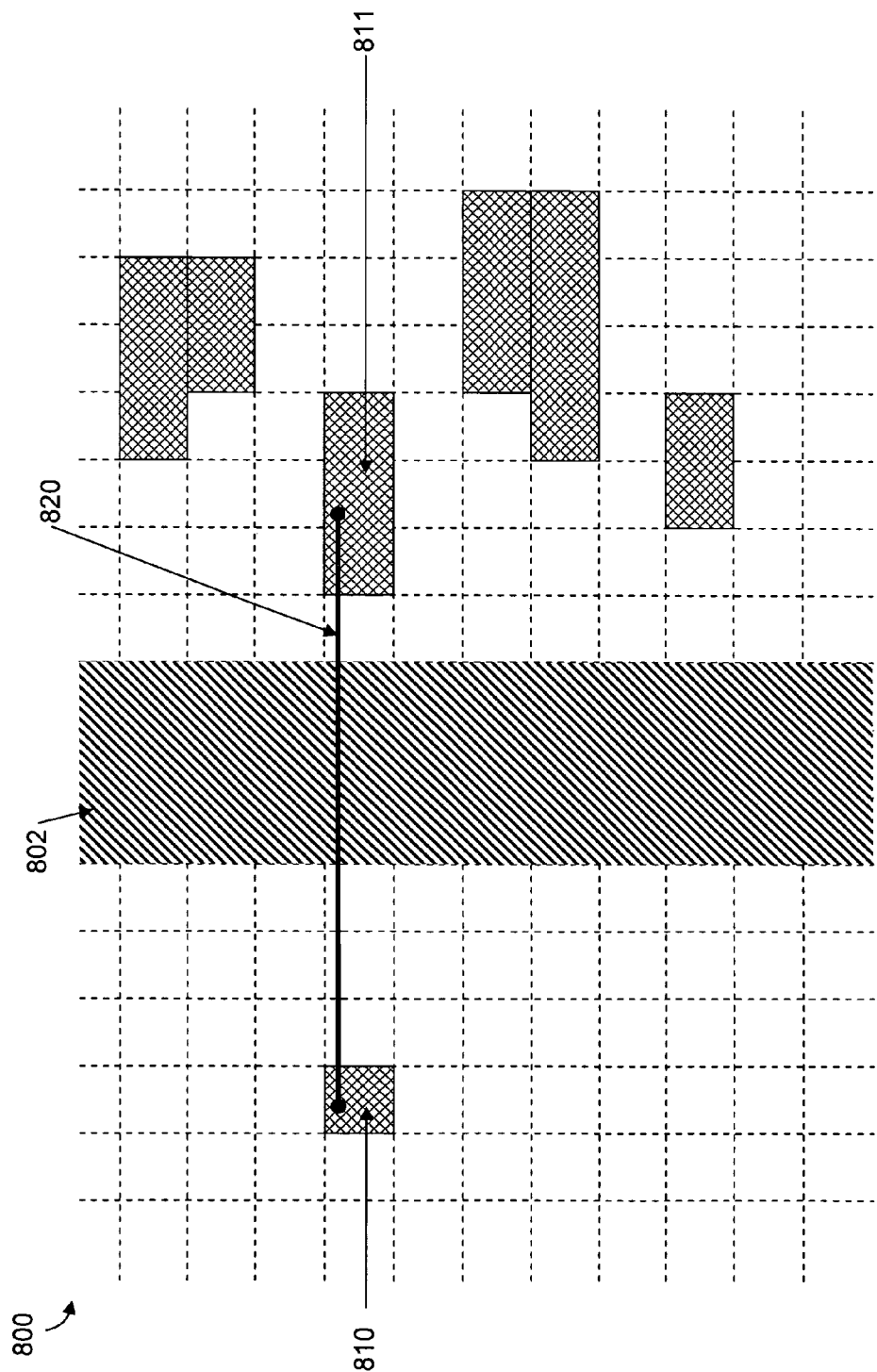
FIG. 8 illustrates an exemplary logic design according to a second embodiment of the present invention.

FIG. 8 illustrates an alternate embodiment of the target device 800. An embodiment of the present invention may be used to design a system onto the target device 800 which is a structured ASIC. The structured ASIC 800 is a hybrid device that includes a number of pre-defined or pre-built layers used to define logic fabric and IP blocks, and a number of customizable design-specific layers used to provide connectivity in the logic fabric and to/from IP blocks.

According to one embodiment, the structured ASIC 800 may include partially-regular structures of pre-built sites which define the logic fabric. One or more sites can be used to implement simple logic functionality, such as combinational and sequential blocks. For example, block 810 is implemented using a single site, while block 811 is shown implemented using 3 sites. The structured ASIC 800 may include embedded IP blocks such as RAM, DSP, and/or IO such as that shown at 802. Customizable layers may be used to connect logical blocks with other logical blocks and with IP blocks. Route 820 illustrates an exemplary connection between two logical blocks. Thus, while the invention described herein may be utilized on the architecture described in FIG. 8, it should be appreciated that it may also be utilized on different architectures, such as those employed by Altera® Corporation in its HardCopy™ Stratix, HardCopy™ II.

Figure 9:
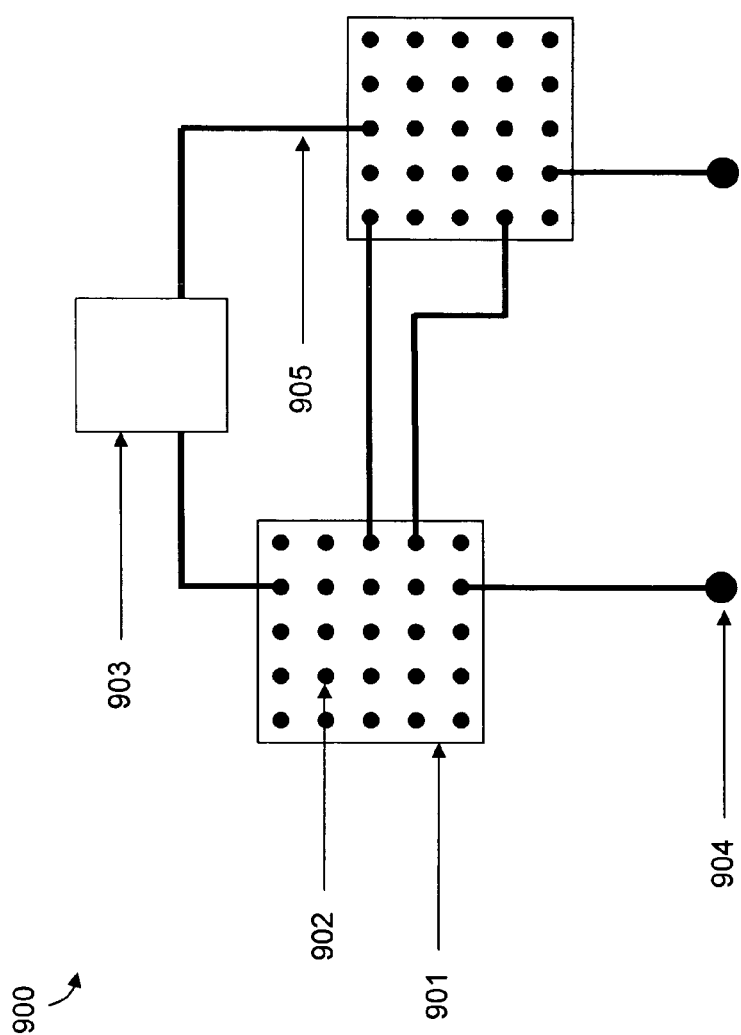
FIG. 9 illustrates an exemplary logic design according to a third embodiment of the present invention.

FIG. 9 illustrates an alternate embodiment of the target device 900. An embodiment of the present invention may be used to design a system onto the target device 900 which is a printed circuit board (PCB). A PCB includes a number of blocks mounted on a board. The board provides connectivity between block pins required to implement the logic design. According to one embodiment, the target device 900 may include integrated circuits 901 which have plurality of pins 902. The target device 900 may include discrete components 903. The target device 900 may include connections to other systems outside of the target device, shown as 904. The target device may include connections implemented on the board shown as 905. It should be appreciated that a system may include a plurality of target devices, such as that illustrated in FIG. 9, cascaded together.

Embodiments of the present invention may be provided as a computer program product, or software, that may include an article of manufacture on a machine accessible or machine readable medium having instructions. The instructions on the machine accessible or machine readable medium may be used to program a computer system or other electronic device. The machine-readable medium may include, but is not limited to, floppy diskettes, optical disks, CD-ROMs, and magneto-optical disks or other type of media/machine-readable medium suitable for storing or transmitting electronic instructions. The techniques described herein are not limited to any particular software configuration. They may find applicability in any computing or processing environment. The terms "machine accessible medium" or "machine readable medium" used herein shall include any medium that is capable of storing, encoding, or transmitting a sequence of instructions for execution by the machine and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

In the foregoing specification embodiments of the invention has been described with reference to specific exemplary embodiments thereof. It will, however, be evident that various modifications and changes may be made thereto without departing from the broader spirit and scope of the embodiments of the invention. The specification and drawings are, accordingly, to be regarded in an illustrative rather than restrictive sense.

What is claimed is:

1. A method for performing routing for a logic design, the method comprising:
   routing a system on the target device;
   determining whether timing data is stale upon detecting a change in signal transition time, wherein the signal transition time is an amount of time required for a signal to transition from a first percentage of a power voltage step height that represents an OFF/ON state to a second percentage of the power voltage step height that represents an ON/OFF state;
   performing static timing analysis if the timing data is stale;
   calculating transition time budgets utilizing information from the static timing analysis; and
   re-routing the system on the target device using the transition time budgets, wherein at least one of the routing, determining, performing, calculating, and re-routing procedures is performed by a processor.

2. The method of claim 1, wherein utilizing signal transition time as a criteria for selecting resources to provide interconnection between the components of the logic design comprises selecting routing resources utilizing the signal transition time of the routing resources as a criteria for selection.

3. The method of claim 1, wherein utilizing signal transition time as a criteria for selecting resources to provide interconnection between the components of the logic design comprises selecting routing resources utilizing the signal transition time of logic block inputs and outputs as a criteria for selection.

4. The method of claim 1, wherein utilizing signal transition time as a criteria for selecting resources to provide interconnection between components of the logic design comprises utilizing transition time budgets to select routing resources for connections in routing.

5. The method of claim 4, wherein transition time budgets comprises input transition time budgets and output transition time budgets.

6. The method of claim 4, wherein a transition time budget of a component is calculated from arrival times of inputs to the component, signal transition time of inputs to the component, implied transition times, and a capacitive load associated with the output of the component.

7. The method of claim 4, wherein a transition time budget is calculated using signal transition times specified by a user and signal transition time requirements of resources on the target device.

8. The method of claim 4, wherein utilizing transition time budgets comprises calculating a transition time budget for a logic block input based on transition time budgets for one or more logic block outputs.

9. The method of claim 4, wherein utilizing transition time budgets comprises calculating a transition time budget for a signal source based on transition time budgets for one or more signal destinations.

10. The method of claim 9, wherein calculating a transition time budget for a signal source comprises estimation of insertion of buffered routing elements.

11. The method of claim 4, wherein utilizing transition time budgets comprises calculating a transition time budget based on a previously computed transition time budget.

12. The method of claim 4, wherein utilizing transition time budgets comprises calculating a transition time budget based on logic block input pin signal arrival times.

13. The method of claim 1, wherein utilizing signal transition time as a criterion for selecting resources to provide interconnection between the components of the logic design comprises:
   routing a system on the target device; and
   re-routing the system on the target device using one or more of updated transition time budgets and updated routing information upon determining that transition time budgets previously used is stale.

14. The method of claim 1, wherein utilizing signal transition time as a criteria for selecting resources to provide interconnection between the components of the logic design in routing comprises:
   calculating initial transition time budgets; and
   routing a system on the target device.

15. The method of claim 1, wherein utilizing signal transition time as a criteria for selecting resources to provide interconnection between the components of the logic design in routing comprises:
   routing a system on the target device;
   calculating a pre-static timing analysis set of transition time budgets utilizing information from routing;
   performing static timing analysis guided by the pre-static timing analysis set of transition time budgets;
   calculating transition time budgets utilizing information from the static timing analysis; and
   re-routing the system on the target device using the transition time budgets.

16. The method of claim 1, wherein utilizing signal transition time as a criteria for selecting resources comprises computing propagation delay based on signal transition time.

17. The method of claim 16, wherein computing propagation delay based on signal transition time comprises computing logic block propagation delay.

18. The method of claim 16, wherein computing propagation delay based on signal transition time comprises computing the propagation delay of a set of routing resources.

19. The method of claim 16, wherein computing propagation delay based on signal transition time comprises computing a change in propagation delay.

20. The method of claim 16, where utilizing signal transition time as a criteria for selecting resources comprises computing a cost as a function of propagation delay or propagation delay change computed from signal transition time.

21. The method of claim 1, wherein timing data is determined to be stale when static timing analysis has not been run for a predetermined number of routing iterations.

22. The method of claim 1, wherein the first percentage of the power voltage step height is approximately 10% and the second percentage of the power voltage step height is approximately 90%.

23. The method of claim 1, wherein utilizing signal transition time as a criteria for selecting resources to provide interconnection between the components of the logic design in routing comprises:
routing a system on the target device;
determining whether timing data is stale;
performing static timing analysis if the timing data is stale;
calculating transition time budgets utilizing information from the static timing analysis;
determining whether the routing is legal; and
re-routing the system on the target device using the transition time budgets in response to determining that the routing is not legal.

24. The method of claim 23, wherein the legality of the routing is determined from usage of routing resources.

25. The method of claim 23, wherein the legality of the routing is determined from whether signal transition time constraints are satisfied.

26. A non-transitory computer readable medium including a sequence of instructions stored thereon for causing a computer to execute a method comprising:
routing a system on a target device;
determining whether timing data is stale upon detecting a change in signal transition time, wherein the signal transition time is an amount of time required for a signal to transition from a first percentage of a power voltage step height that represents an OFF/ON state to a second percentage of the power voltage step height that represents an ON/OFF state;
performing static timing analysis if the timing data is stale;
calculating transition time budgets utilizing information from the static timing analysis; and
re-routing the system on the target device using the transition time budgets.

27. The non-transitory computer readable medium of claim 26, wherein the signal transition time is a delay required for a signal to transition to a different value.

28. The non-transitory computer readable medium of claim 26, wherein the specific routing resource has a specific location.

29. A system designer, comprising:
a routing unit to route a system on a target device;
a routing manager to determine whether timing data is stale upon detecting a change in signal transition times, wherein the signal transition time is an amount of time required for a signal to transition from a first percentage of a power voltage step height that represents and OFF/ON state to a second percentage of the power voltage step height that represents an ON/OFF state;
a static timing analysis unit to perform static timing analysis if the timing data is stale;
a transition time budget unit to calculate transition time budgets utilizing information from the static timing analysis, wherein the routing unit re-routes the system on the target device using the transition time budgets.

30. The system designer of claim 29, wherein the routing unit comprises:
a router unit to select routing resources for a connection;
a static timing analysis unit to perform static timing analysis on the routing; and
a transition time budget unit to calculate transition time budgets utilizing information from the static timing analysis.

31. The system designer of claim 30, further comprising a routing manager to direct the router unit to reroute a system on the target device using the transition time budgets.

32. The system designer of claim 31, wherein the router unit reroutes the system using one of the transition time budgets and updated routing information.

33. The system designer of claim 32, wherein the transition time budget unit generates an initial transition time budgets for the router unit to utilize.

34. A method for designing a system on a target device, comprising:
routing the system on the target device;
determining whether timing data is stale when a change in signal transition time is detected, wherein the signal transition time is an amount of time required for a signal to transition from a first percentage of a power voltage step height that represents an OFF/ON state to a second percentage of the power voltage step height that represents an ON/OFF state;
performing static timing analysis in response to determining that the timing data is stale;
calculating transition time budgets utilizing information from the static timing analysis; and
re-routing the system on the target device using the transition time budgets in response to determining that the timing data is stale, wherein one of the routing, determining, performing, and calculating is performed by a processor.

* * * * *